US008391895B2

(12) United States Patent
Aerrabotu (10) Patent No.: US 8,391,895 B2
(45) Date of Patent: Mar. 5, 2013

(54) METHOD AND APPARATUS FOR PROVIDING LOCATION-BASED INFORMATION

(75) Inventor: Naveen Aerrabotu, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 761 days.

(21) Appl. No.: 12/343,466

(22) Filed: Dec. 23, 2008

(65) Prior Publication Data

US 2010/0159955 A1    Jun. 24, 2010

(51) Int. Cl.
*H04W 24/00* (2009.01)
(52) U.S. Cl. .................. 455/456.3; 455/41.2; 455/26.1; 455/575.2; 709/227; 709/224; 709/225; 709/219; 370/318; 370/328; 370/338; 370/331; 370/392
(58) Field of Classification Search ............. 455/456.3, 455/414.3, 436, 550.1, 404.1, 456.1, 130, 455/12.1, 3.06; 705/14.46, 14.42, 35; 709/239, 709/245, 242, 223
See application file for complete search history.

(56) References Cited

U.S. PATENT DOCUMENTS

| | | | |
|---|---|---|---|
| 5,897,619 A * | 4/1999 | Hargrove et al. ................. 705/4 |
| 6,240,360 B1 | 5/2001 | Phelan | |
| 6,243,030 B1 | 6/2001 | Levine | |
| 6,243,039 B1 * | 6/2001 | Elliot ............................ 342/457 |
| 6,604,049 B2 | 8/2003 | Yokota | |
| 6,629,136 B1 * | 9/2003 | Naidoo ......................... 709/219 |
| 200 /0240847 | 10/2006 | Choi | |
| 7,844,729 B1 * | 11/2010 | Friedman et al. ............. 709/238 |
| 8,125,332 B2 * | 2/2012 | Curran et al. ............. 340/539.13 |

| | | | |
|---|---|---|---|
| 2002/0101619 A1 | 8/2002 | Tsubaki et al. | |
| 2003/0125046 A1 * | 7/2003 | Riley et al. .................... 455/456 |
| 2004/0204063 A1 * | 10/2004 | Van Erlach ............... 455/556.1 |
| 2005/0222767 A1 | 10/2005 | Odamura | |
| 2005/0234922 A1 * | 10/2005 | Parekh et al. .................... 707/10 |
| 2006/0099959 A1 * | 5/2006 | Staton et al. ............... 455/456.1 |
| 2006/0129636 A1 | 6/2006 | Matsuura et al. | |
| 2007/0032947 A1 | 2/2007 | Yamada et al. | |
| 2007/0168121 A1 * | 7/2007 | Adachi ........................ 701/208 |
| 2007/0219708 A1 | 9/2007 | Brasche et al. | |
| 2007/0233385 A1 | 10/2007 | Dicke et al. | |
| 2008/0026735 A1 * | 1/2008 | Lee ............................ 455/414.3 |
| 2008/0033646 A1 * | 2/2008 | Morgan et al. ................ 701/213 |

(Continued)

OTHER PUBLICATIONS

Garmin, Ltd., "Garmin: POI Loader", www8.garmin.com/products/poiloader, copyright 1996-2008 (printed Dec. 23, 2008), 3 pages.

(Continued)

*Primary Examiner* — Joseph Arevalo
(74) *Attorney, Agent, or Firm* — Sylvia Chen (57) ABSTRACT

A method and apparatus for providing location-based information to a wireless communication device is disclosed. The wireless communication device receives its geographic position information and provides its geographic position information to a web server while accessing a web service provided by the web server. Based on the geographic position information received from the wireless communication device, the web server provides geographic coordinates of locations relevant to the web service in the form of web geo-cookies. The wireless communication device maintains a database of the received geographic coordinates. When the wireless communication accesses a geographic map of a route or region, the wireless communication device determines if the geographic coordinates in the database lie within boundaries of the accessed map. The geographic coordinates that lie within boundaries of the received map are annotated and displayed on the wireless communication device.

17 Claims, 7 Drawing Sheets

U.S. PATENT DOCUMENTS

| | | | | |
|---|---|---|---|---|
| 2008/0208962 | A1* | 8/2008 | Kim et al. | 709/203 |
| 2009/0093261 | A1* | 4/2009 | Ziskind et al. | 455/456.3 |
| 2010/0114854 | A1* | 5/2010 | Lee | 707/707 |
| 2010/0131501 | A1* | 5/2010 | Deeming et al. | 707/724 |
| 2010/0153552 | A1* | 6/2010 | Parekh et al. | 709/225 |

OTHER PUBLICATIONS

Google, Inc., "Google Maps: Local Business Center", www.google.com/accounts/ServiceLogin?continue=http%3A%2F%2Fwww.google.com%2Flocal%2Fadd%2Fbusiness, copyright 2007 (printed Dec. 23, 2008), 2 pages.

Google, Inc., "Google: Maps Help", www.maps.google.com/support/bin/answer.py?answer=68480, copyright 2008 (printed Dec. 23, 2008), 7 pages.

Microsoft, Inc., "Internet Explorer 6: Use Favorites to Get Around the Web", www.microsoft.com/windows/ie/ie6/using/howto/share/favorites.mspx, copyright 2008 (printed Dec. 23, 2008), 6 pages.

Internet Assigned Numbers Authority (IANA), "Uniform Resource Identifier (URI) Schemes per RFC4395", Nov. 4, 2008 (printed Dec. 23, 2008), 4 pages.

Microsoft, Inc., "Information About Cookies on Microsoft.com", www.microsoft.com/info/cookies.mspx, copyright 2008 (printed Dec. 23, 2008), 6 pages.

Patent Cooperation Treaty, "Notification of Transmittal of the International Search Report and the Written Opinion of the International Searching Authority, or the Declaration" for PCT/US2009/065596, Mar. 1, 2010, pp. 1-16.

* cited by examiner

METHOD AND APPARATUS FOR PROVIDING LOCATION-BASED INFORMATION

FIELD OF THE DISCLOSURE

The present disclosure relates in general to a wireless communication device and more specifically to a method for providing location-based information to the wireless communication device.

BACKGROUND

Recently there has been a good deal of interest in Global Positioning System (GPS) enabled wireless communication devices that can track location, give directions to a destination, and provide information about nearby businesses. GPS-enabled devices such as cellular phones, beepers, and portable GPS units, have a GPS receiver for receiving satellite signals from the GPS satellite network. These signals allow determination of the GPS-enabled device's position. Such a device allows for precisely locating the device in terms of latitude and longitude (and sometimes altitude) using the GPS receiver. Some GPS-enabled devices use a database of maps and a display for showing the device's position with reference to a map. The map may include additional information linked with the device's position such as locations of nearby restaurants, hospitals, petrol pumps, etc.

Such services, however, are only as good as the map database; outdated maps can lead to inaccurate directions. Therefore, GPS-enabled devices often have to request a GPS service provider for recent maps containing updated location-based information. This process is time consuming and bandwidth intensive thereby increasing network congestion. Moreover, GPS capable devices usually show the location-based information that has coordinates lying close to the coordinates of the device's location on the map. However, the locations shown on the map might not be of interest to the user of the GPS receiver device.

Accordingly, there is an opportunity to provide location-based information to the GPS-enabled wireless communication device in a more time-efficient and bandwidth-efficient manner.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments of the invention disclose a method for providing location-based information to a wireless communication device. By mapping information that a user has already indicated as being of interest, location-based information can be provided to a user of a GPS-enabled wireless device in a more time-efficient and bandwidth-efficient manner. The user's interest can be indicated by simply accessing a web service relevant to the user's interest. For example, if the user has indicated an interest in a particular chain of restaurants, the web service can provide files with the locations of the chain of restaurants and nearby restaurants of that chain can be highlighted on a displayed map on a GPS-enabled wireless device.

The wireless communication device receives its current position information from a location server. The wireless communication device accesses a web service and provides its position information to a web server providing the web service. The web server provides geographic coordinates of locations that are relevant to the web service to the wireless communication device based on the position information given by the wireless communication device. The wireless communication device requests the location server for a geographic map of a region or a route. The location server provides the requested map to the wireless communication device. The wireless communication device maps the received geographic coordinates onto the map and highlights the locations that lie within the coordinates of the map.

Before describing in detail the method for providing location-based information to a wireless communication device, it should be observed that the present invention resides primarily in combinations of method steps and apparatus components related to providing location-based information to a wireless communication device. Accordingly, the method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Figure 1:
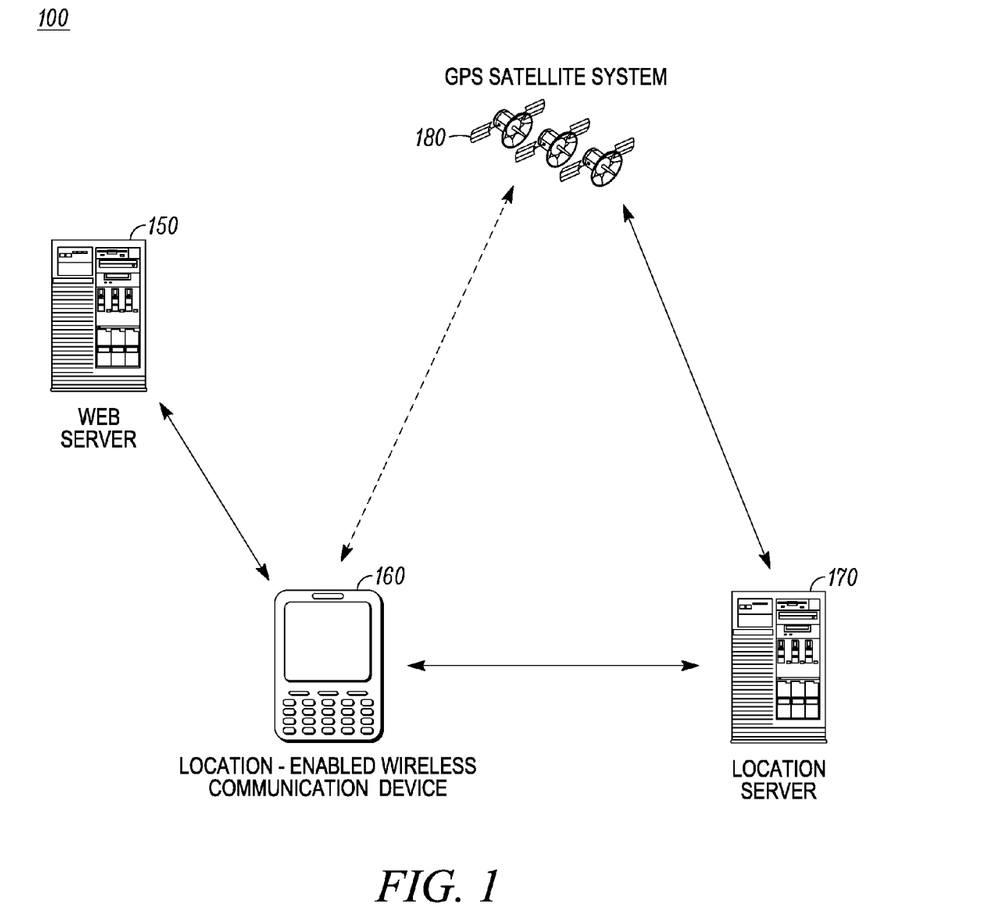
FIG. 1 is a block diagram illustrating a wireless communication system in accordance with some embodiments.

FIG. 1 is a block diagram illustrating a wireless communication system 100 for providing location-based information in accordance with some embodiments. The wireless communication system 100 includes a web server 150, a location-enabled wireless communication device 160, a location server 170, and a GPS satellite system 180. The wireless communication device 160 communicates with the web server 150 and the location server 170 over a wireless cellular communications network (not shown). Examples of the wireless communication device 160 (sometimes called "user equipment") include a mobile phone, a personal digital assistant, a laptop with wireless connection, or any other electronic device having the ability to send and/or receive wireless communication information.

The wireless communication device 160 includes a radio communication transceiver, for example, a wideband code division multiple access (W-CDMA) transceiver, a Universal Mobile Telecommunication Services (UMTS) transceiver, a Global System for Mobile communications (GSM)/Generalized Packet Radio Services (GPRS) transceiver, or some other cellular communications transceiver for communication with the web server 150 and the location server 170 over a wireless communication network. In some embodiments, the wireless communication device 160 includes a non-cellular communication transceiver, for example, a Bluetooth transceiver or a WiFi transceiver either alone or in combination with a cellular transceiver for communication with the web server 150 and the location server 170.

The wireless communication device 160 includes a Satellite Positioning System (SPS) receiver, for receiving satellite signals from a constellation of earth orbiting satellites, e.g., a GPS receiver for receiving signal from the GPS satellite system 180. The GPS satellite system 180 mentioned herein is a navigation satellite system that enables a wireless communication device 160 to determine its location, speed, direction, and time using microwave signals transmitted from GPS satellites.

In an autonomous location determination embodiment, the position of the wireless communication device 160 may be computed autonomously at the wireless communication device 160 based on timing signals received from GPS satellite system 180. The timing signal used herein contains the time shown by an atomic clock of a GPS satellite. The wireless communication device 160 uses the arrival time of the timing signals to compute its distance to each of at least three GPS satellites, from which it determines its current location.

In an assisted location determination embodiment, the wireless communication device 160 computes its current position using assistance information received from the location server 170 and at least three GPS satellites. The assistance information includes precise GPS satellite orbit and clock information; initial position and time estimate; and for assisted GPS-only receivers, satellite selection, range, and range-rate information. With assistance from the location server 170, the GPS receiver can operate more quickly and efficiently than it would autonomously, because a set of tasks that it would normally handle is shared with the location server 170. In such assisted GPS systems, the wireless communication device 160 uses the signals from the orbiting GPS satellites in conjunction with the assistance information received from the location server 170 to compute a location of the wireless communication device 160. Assisted GPS devices can often get a fix on the device's location faster than an autonomous GPS receiver. Some assisted GPS systems can work inside buildings, under dense foliage, and in city areas where autonomous GPS receivers cannot receive signals.

In a network-based location determination embodiment, the location server 170 is able to compute the current position of the wireless communication device 160. The location server 170 has the ability to access the wireless communication device's 160 signal information from nearby base stations (towers) in the wireless communications network and also has computing power far beyond that of the GPS receiver in the wireless communication device 160. Network-based location computation schemes include time difference of arrival (TOA), enhanced observed time of arrival (E-OTD), angle of arrival (ATA) schemes, among others, none of which are intended to limit the types of location determinations that may be made.

After the current position of the wireless communication device 160 is determined using autonomous, assisted, or network-based methods, the position information is sent to the web server 150. The web server 150 (sometimes called "application server") is a computer that runs a program which is responsible for accepting requests from the wireless communication device 160 and for serving responses along with data content to the wireless communication device 160. The web server 150 is capable of hosting a web service. The web service used herein is a web-based application programming interface that can be accessed over a network and executed on a remote system hosting the requested service. In an example, the web service can be one of or a combination of a website, an email service, and voice over IP (VoIP) service.

Figure 2:
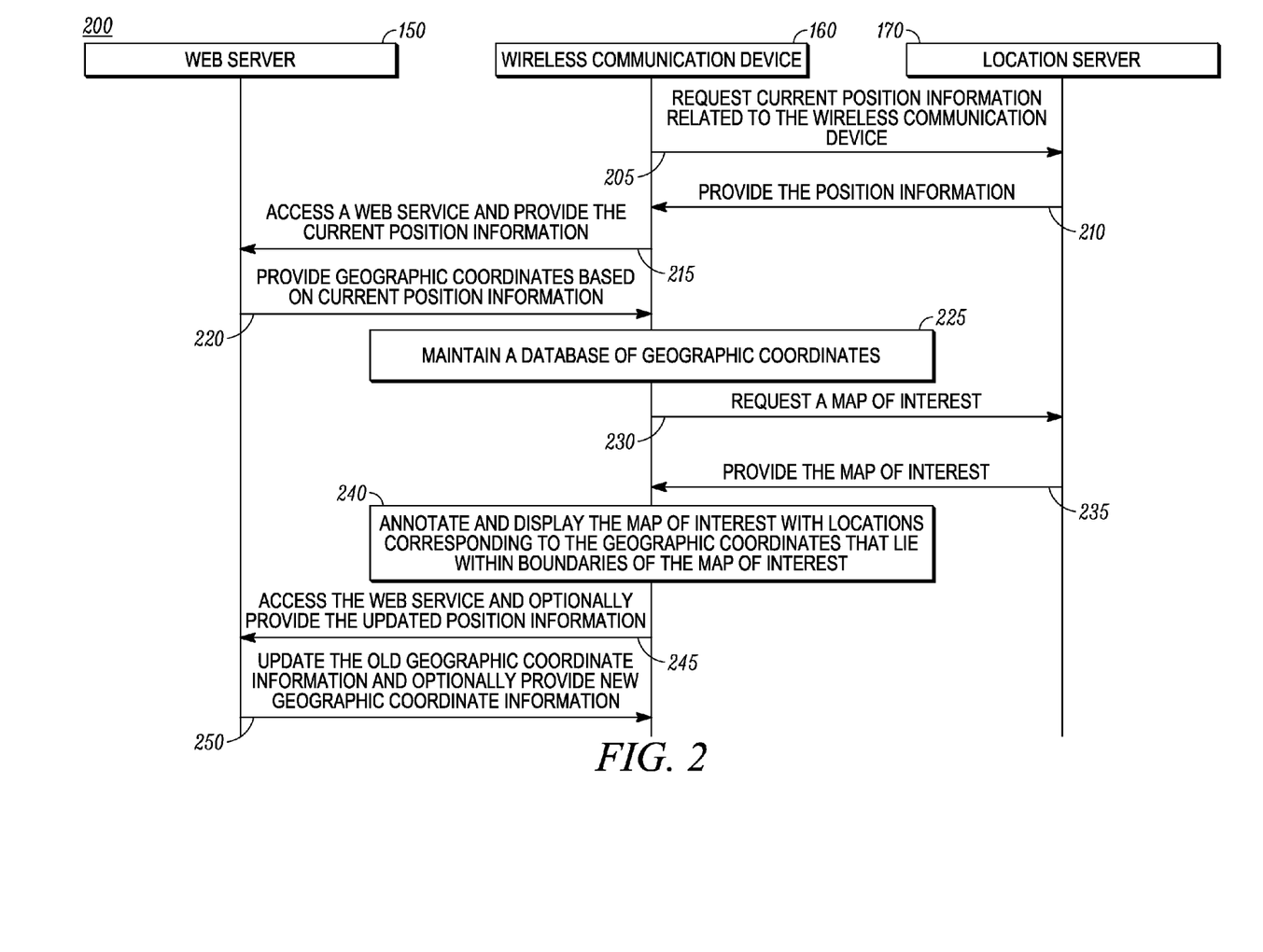
FIG. 2 is a message flow diagram illustrating a method of providing location-based information in accordance with some embodiments.

FIG. 2 is a message flow diagram 200 illustrating a method of providing location-based information in accordance with some embodiments. As shown, the wireless communication device 160 requests 205 current position information of the wireless communication device 160 from the location server 170. The location server 170 upon receiving the request, assuming network-based location determination, computes the current position of the wireless communication device and sends 210 the position information to the wireless communication device 160. Alternately, the wireless communication device 160 can determine location autonomously or using assisted location determination. When the wireless communication device 160 accesses a web service, the wireless communication device 160 provides 215 its position information to the web server 150 providing the web service. In an embodiment, the web service is of interest to a user of the wireless communication device 160, e.g., a website of a particular restaurant chain. In this example, the current position information is obtained immediately prior to accessing a web service. Alternate embodiments can handle large variations in time between obtaining current position information and accessing a web service; however, a shorter delay will generally provide results more relevant to a user.

The web server 150, provides 220 geographic coordinates of locations which are relevant to the web service, as predetermined by the web service, based on the current position of the wireless communication device 160. For example, if the wireless communication device 160 accesses a web server 150 of a particular restaurant chain then the web server 150 might provide geographic co-ordinates relating to restaurant locations. The web server 150 provides geographic coordinates in the form of web geo-cookies which are cookie files containing longitude and latitude values. In order to overcome network bandwidth and memory limitations, the number of geo-cookies provided can be limited based on factors such as speed of network connection, available memory on the wireless communication device, etc. Such information is collected by the web server 150 through a device capability query performed on the wireless communication device by the server at the time of session establishment. The capabilities queried may include size of display, codec support, device type (e.g., 2G, 3G), memory (available and threshold flash or disk storage), etc. The web server 150 determines the number of geo-cookies that can be provided to the wireless communication device using these above criteria as input. The geo-cookies can be prioritized based on the closest to farthest location entries from the wireless communication device's 160 present location. In another example, the geo-cookies can be prioritized based on the location entries that lie on a closest route from the wireless communication device's 160 present location. Alternately, the wireless communication device 160 can be configured to remove those cookies which are farthest from its location or are separated from its location by more than a certain distance.

In another embodiment, the web server 150 determines the number of geo-cookies that can be provided to the wireless communication device 160 based on link quality parameters such as signal strength, error rate, signal to noise ratio etc., of the communication channel. For example, the web server 150 receives the link quality information from the wireless communication device 160 at the time of session establishment. If the link quality indicates good signal strength, the web server 150 can provide geo-cookies having location entries that are within a short distance say 5 miles from the present location of the wireless communication device 160. Since, the signal strength of the channel is good, the wireless communication device 160 can receive the geo-cookies at several intermittent times instead of one time, thereby saving network bandwidth. Instead, if the link quality indicates weak signal strength, the web server 150 can provide geo-cookies having location entries that are within a long distance say 10 miles from the present location of the wireless communication device 160. Since, the signal strength of the channel is weak, the wireless communication device 160 might get disconnected from the communication network. In case of a disconnection, the geo-cookies received for the 10 miles can be used to derive map information until the network connection is re-established with the next available node in the network.

A web geo-cookie is a file containing at least a name of a location and a coordinate value of the location (e.g., store #101, 13°19'43" N, 23° 27'30" E). Although only one location is provided in this geo-cookie example, other embodiments can concatenate multiple locations into one geo-cookie file. The web geo-cookie may also include other fields such as a time stamp based on the system time on the wireless communication device 160 when the geo-cookie was downloaded and a number of times the geo-cookie file was accessed by the wireless communication device 160. In an embodiment, when the wireless communication device 160 receives geo-cookies having geographic coordinates from the web server 150, a web browser on the wireless communication device 160 allows configuring a favorites list to include location specific favorites. A favorite list is an internet bookmarking mechanism having stored URLs that can be retrieved by the browser. The favorites list is generally in the form of a folder metaphor. The web browser allows adding a URL of the web service to the favorites list and tagging it as a "location favorite." The favorites tagged as location favorites can be distinguished by e.g., showing a globe or map icon next to the location favorite.

For example, the URL of the tagged web service may be saved in a format as shown:

httpl://motorola.com/portal/site

When the wireless communication device 160 accesses a web service from the location favorites list, the web browser's request to the web server 150 indicates that the request embedded is for the location information of services hosted by the web service. The web server 150 then acknowledges the request with recent location specific information.

In another example, the web service can be tagged using one or more of the following formats:

location://<location server>/<service>; or
  location://locater.home.us/<directions:www.motorola.com>

The above formats allow a web server hosting the web service to be connected through a client and the client indicates to the web server that the service desired is location specific. The web services tagged as location favorites will refer to information relating to location, driving direction, etc., of services hosted by the web service instead of referring to web pages. Of course other formats could be used.

For example, if a wireless communication device accesses a web server of a particular restaurant chain, then the web server might provide geographic coordinates relating to restaurant locations. The URL of the web service is added to the favorites list by the user and tagged as a "location favorite." The browser extracts information relating to location coordinates of the restaurants from geo-cookies received from the web server and saves such information in memory. In an embodiment, when a location favorite is accessed from the favorites list, the web browser requests the web server 150 for location specific information. The web server 150 provides up-to-date location specific information having geographic coordinates of locations.

In an embodiment, the wireless communication device 160 maintains 225 a database of the geographic coordinates received each time any such web service is accessed. The database of the received geographic coordinates is stored in a persistent memory of the wireless communication device 160. In another embodiment, the database of the received geographic coordinates is stored in a persistent memory of the location server 170.

The wireless communication device 160 requests 230 a geographic map of interest from the location server 170. The map of interest might be a geographic map of a route or region. The location server 170 then retrieves the requested map from a web server 150 and sends 235 the requested map to the wireless communication device 160. In another embodiment, the map might be supplied through removable storage mediums such as plug-in map cartridges, compact discs etc., and stored on a memory of the wireless communication device 160. Upon receiving the map of interest from the location server 170 or upon accessing a pre-stored map, the wireless communication device 160 accesses the database and determines if the geographic coordinates lie within boundaries of the received map. If it is determined that certain geographic coordinates fall within the boundaries of the map of interest, the wireless communication device 160 annotates 240 (e.g., marks, highlights and/or, adds text or graphics) the locations that correspond to those geographic coordinates. In an example, the locations are annotated by using special effects, pointers, color effects, icons, etc. The map with the annotated locations is then displayed on the wireless communication device 160. When the wireless communication device annotates a location based on a geo-cookie, the wireless communication device 160 increments the number of times the geo-cookie file was accessed, which is a field in the geo-cookie file.

When the wireless communication device 160 accesses 245 the same web service at a subsequent time, the web server 150 determines whether the wireless communication device 160 has accessed the web service at an earlier time by searching for relevant web geo-cookies that might be stored on the wireless communication device 160. If web geo-cookies of the web service are found in the wireless communication device 160, the web server 150 updates 250 the geographic information contained in the web geo-cookies as needed. The web server 150 determines which geo-cookie needs to be updated based on the system time recorded in the geo-cookies as they were downloaded. In another embodiment, the wireless communication device 160 provides its updated position information during the subsequent access 245. Using the updated position information of the wireless communication device 160, the web server 150 determines whether new geo-cookies need to be provided or existing geo-cookies be updated. The geo-cookies are updated by deleting, replacing, or adding to geographic information previously contained in the geo-cookie. For example, the updated geographic information includes geographic coordinates of relocated stores and/or newly opened stores and deletes geographic information of closed stores.

In an example, a user accesses a website (e.g., a Motorola website) using the wireless communication device 160. The last-computed position information of the wireless communication device 160 is provided to the web server 150 during access 215. The web server of the Motorola website provides 220 geographic coordinates of Motorola retail stores and Motorola authorized stores to the wireless communication device in the form of one or more web geo-cookies. The user of the wireless communication device visits Chicago, Ill., USA and the device requests 230 a map of Chicago from a location server 170 and receives 235 the map from the location server 170. The wireless communication device maps the geographic coordinates provided by the Motorola web server onto the coordinates of the received map. The wireless communication device then marks the locations of all Motorola stores in Chicago whose geographic coordinates fall within the map of Chicago and displays 240 the map for the user. When the user accesses 245 the Motorola website at a subsequent time, the web server searches stored web geo-cookies in the wireless communication device 160 to determine whether the stored web geo-cookies already have the most accurate geographic coordinates of Motorola stores. If the web server detects that the stored web geo-cookies have geographic information of Motorola stores that are now obsolete, then the web server provides 250 updated geographic coordinates of the Motorola stores in Chicago if there has been a change in the location information for some of the Motorola stores.

Figure 3:
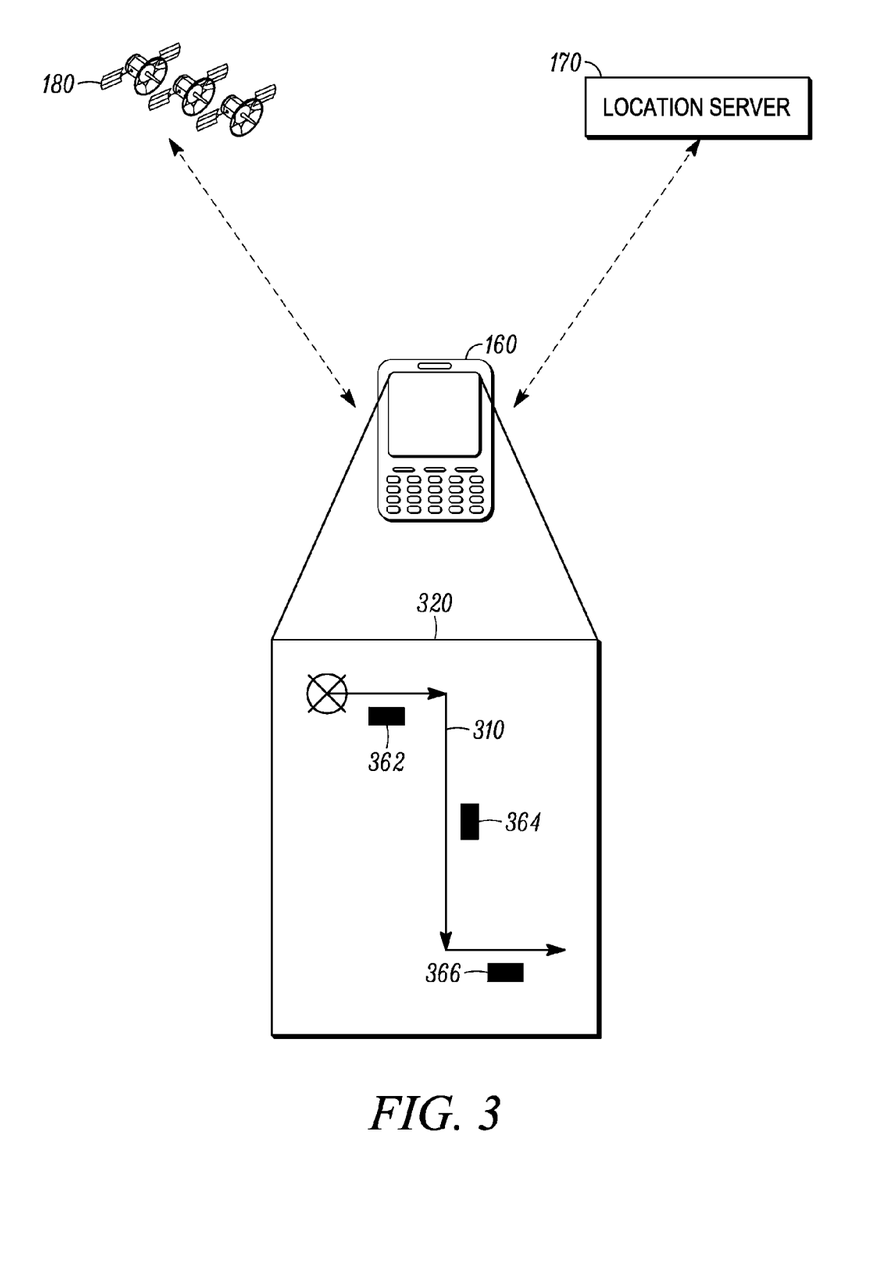
FIG. 3 is a diagram illustrating a wireless communication device in accordance with some embodiments.

In another example as shown in FIG. 3, a wireless communication device 160 is moving from say Schaumburg, Ill. to Chicago, Ill. The wireless communication device 160 requests 205 a location server 170 for the wireless communication device's 160 current location and receives 210 the current location information. The location server 170 computes the current location using, for example, a network-based location determination. Alternately, in an autonomous location determination, the wireless communication device computes its current position based on signals received from GPS satellite system 180. Otherwise, in an assisted location determination, the wireless communication device computes its current position using signals from the GPS satellite system 180 and assistance information received from the location server 170. When the wireless communication device accesses 215 a website (e.g., Motorola website), the web server of the Motorola website provides 220 the geographic coordinates of at least one Motorola store in the form of a web geo-cookie downloaded to the wireless communication device 160 based on the last-computed location of the wireless communication device. The wireless communication device 160 then requests 230 a geographic route map 320 of a route 310 from the location in Schaumburg to a destination in Chicago from the location server 170 and receives 235 the map from the location server 170. The geographic route map 320 may include turn-by-turn directions (not shown). The wireless communication device 160 then maps the geographic coordinates provided by the web server onto the received route map 320 and highlights 240 locations of those Motorola stores 362, 364, and 366 which lie within the boundaries of the received route map 320.

In an embodiment, the wireless communication device 160 can be configured to update its geographic coordinates database, specifically when the wireless communication device 160 is moving. For example, the wireless communication device 160 can be configured to auto-update the database after determining that the current location of the wireless communication device 160 exceeds a certain distance from the position information provided to a web service. If the current location of the wireless communication device 160 exceeds a radius of, say 20 miles from the position information provided to the web service, then the wireless communication device 160 automatically initiates a network connection with the web service and synchronizes the geo-cookies. Auto-update of geo-cookies can be limited to only certain web services such as only those web services saved in a favorites list in the wireless communication device 160. Alternately or additionally, the wireless communication device 160 can ask the web server 150 for geo-cookies based on time elapsed rather than distance traveled. Additionally, the wireless communication device 160 can be configured to manually update the geographic coordinates database. The user of the wireless communication device 160 can explicitly request an update or addition of new relevant geographic coordinates. This may happen if the user notices that geo-cookies were deleted based on the distance configuration, if the wireless communication device 160 has moved to a new location, or if the user notices a geo-cookie might need updating (e.g., by passing a 'store opening soon' sign).

For example, a wireless communication device 160 in Schaumburg receives geographic coordinates tailored to its current location in Schaumburg from the web server 150. The wireless communication device 160 then moves to Chicago and asks the location server 170 for a map of Chicago. The wireless communication device would then determine whether the wireless communication device's new current location in Chicago is beyond a pre-determined distance from the position information last used to obtain geo-cookies in the database for a particular web service. If the wireless communication device's 160 new current location is beyond the pre-determined distance from the position information provided when accessing that particular web service then the wireless communication device 160 accesses the web service and updates the database as discussed above.

Figure 4:
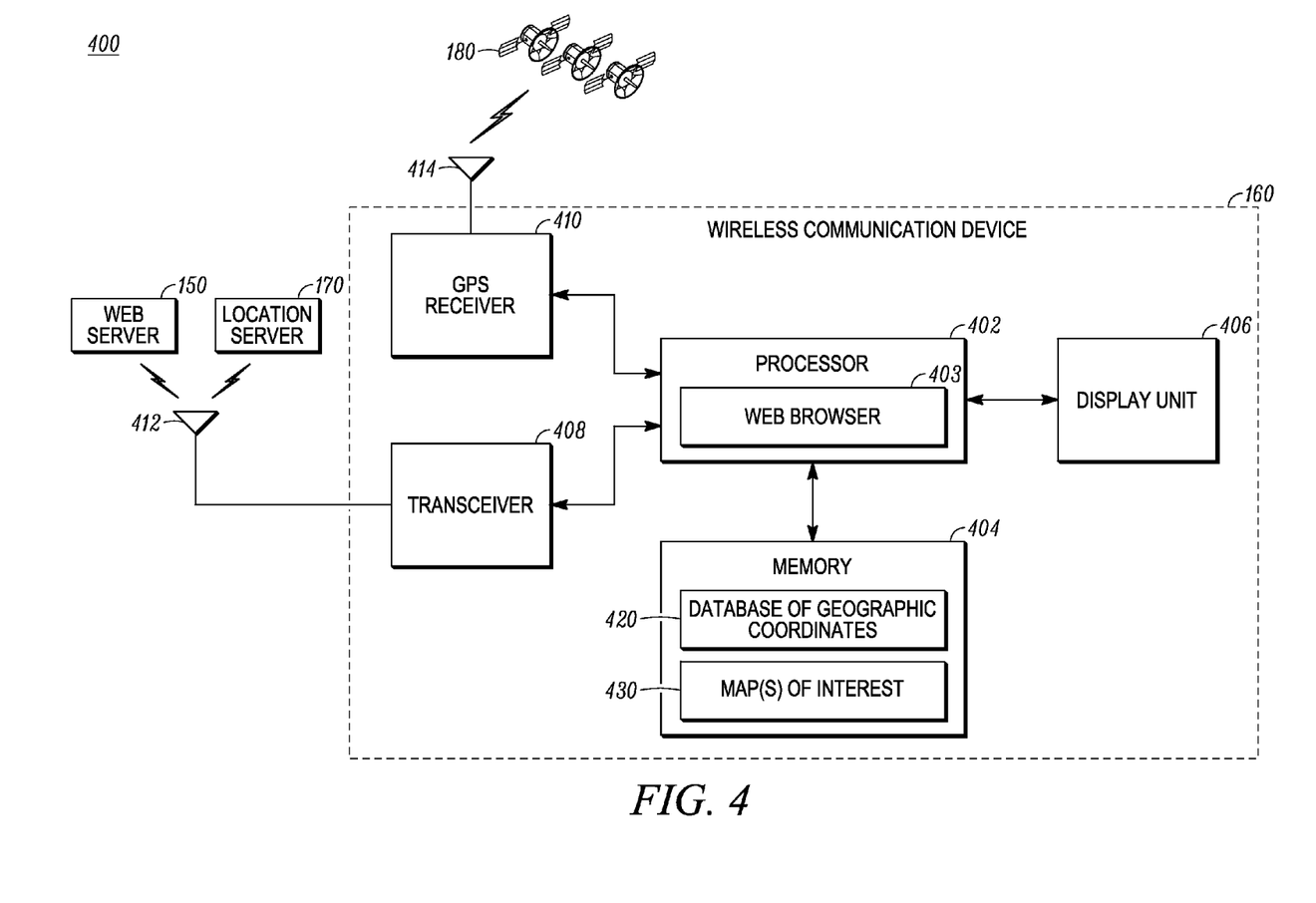
FIG. 4 is a block diagram of a GPS-enabled wireless communication device in accordance with some embodiments.

FIG. 4 is a block diagram 400 of a GPS-enabled wireless communication device 160 in accordance with some embodiments. The wireless communication device 160 comprises a processor 402, a memory 404, a display unit 406, a transceiver 408 for communicating with a web server 150 through antenna 412, and a GPS receiver 410 for communicating with the GPS satellite system 180 through a GPS antenna 414. Of course, other satellite positioning systems may be substituted for GPS. The wireless communication device 160 is an integrated unit containing at least all the elements depicted in FIG. 4, as well as any other elements necessary for the wireless communication device 160 to perform its particular electronic function(s). Alternatively, the wireless communication device 160 can comprise a collection of appropriately interconnected units or devices housed within the same physical unit, wherein such units or devices perform functions that are equivalent to the functions performed by the above-described elements of the wireless communication device 160. The wireless communication device 160 may be any type of wireless communication device including, but not limited to, cellular phones, mobile stations, wireless telephones, PDAs (personal digital assistants), and hand-held GPS satellite receivers.

The processor 402 includes one or more microprocessors, microcontrollers, DSPs (digital signal processors), state machines, logic circuitry, or any other device or devices that process information based on operational or programming instructions. The processor 402 includes a web browser 403 which is a software application that enables a user to access information available from a web server 150. The web browser 403 enables the user of the wireless communication device to access a web service through a web server 150 on the network. The processor 402 is operationally connected to a memory 404. The memory 404 can be any form of non-volatile memory, such as a hard disk or a portable storage unit, and/or a volatile memory such as random access memory. The memory 404 includes a database 420 of geographic coordinates and a storage space 430 for maps of interest. The database 420 of geographic coordinates is used for storing geographic coordinates received from the web server 150.

The transceiver 408 can be implemented as a transmitting and receiving component of the wireless communication device 160 in accordance with known techniques. The transceiver 408 is connected to the processor 402 and provides geographic coordinates of a location to the processor. In an embodiment, some of the functions of the transceiver 408 can be implemented in the processor 402. The transceiver unit 408 is used for accessing the web service wirelessly and for receiving geographic coordinates relevant to the web service from the web server 150. The geographic coordinates are received in the form of geo-cookies. The geographic coordinates received from the web server 150 include at least latitude and longitude values. In the case of an assisted GPS system, the transceiver 408 receives GPS assistance information from the location server 170.

The GPS receiver 410 connected to the processor 402 is used for receiving timing signals from the GPS satellite system for calculating the current position of the wireless communication device 160 in the case of an autonomous or assisted GPS system. The GPS receiver 410 can also receive a map of a region or a route requested by the wireless communication device 160 from the location server 170 through a data channel over a radio network. Antenna 412 and GPS antenna 414 include any known or developed structure for radiating and receiving electromagnetic energy in the frequency range containing the wireless carrier frequencies.

The processor 402 receives the map of a route or region through the GPS receiver 410 and stores the received map in storage space 430 in memory 404. The processor also receives maps of interest to a user through removable storage mediums and stores them in storage space 430. When the processor receives a map from the location server 170 through the GPS receiver 410 or retrieves a map from storage space 430 in response to a request, the processor 402 accesses the database 420 and determines whether the geographic coordinates in the database 420 lie within the coordinates of the received/retrieved map. The processor 402 then highlights the locations corresponding to the geographic coordinates that lie within the boundaries of the map and displays the annotated map on the display unit 406.

Figure 5:
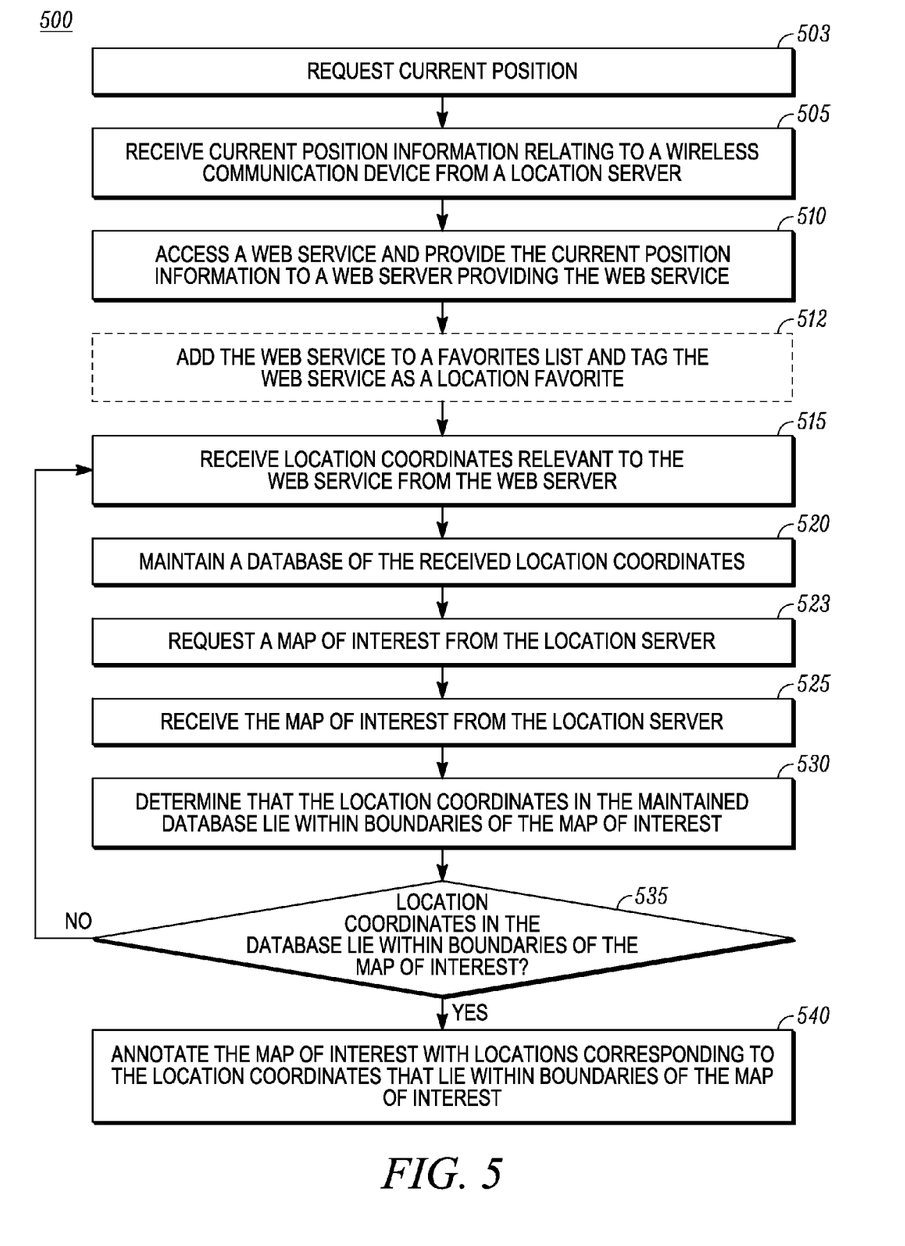
FIG. 5 is a flow chart illustrating a method of providing location-based information in accordance with some embodiments.

FIG. 5 is a flow chart 500 for a wireless communication device 160 operating in accordance with the message flow diagram 200 of FIG. 2. The wireless communication device 160 requests 503 that the location server 170 provide current position information of the wireless communication device 160. At step 505, the wireless communication device 160 receives its current position information from the location server 170. At step 510, the wireless communication device 160 accesses a web service and provides the current location information (obtained in step 505) to a web server 150 providing the web service. In an embodiment, at step 512, the wireless communication device adds the web service to a favorites list and tags the web service as a location favorite. The web service is tagged as a location favorite by storing the URL of the web service in a specific format. At step 515, the wireless communication device 160 receives the geographic coordinates relevant to the web service from the web server 150 based upon the current position information. The geographic coordinates relevant to the web service are the coordinates of geographic locations associated with the web service; those coordinates are programmed by the web service provider and may be updated. At step 520, the wireless communication device 160 maintains a database of the received geographic coordinates in a memory. Here, maintaining a database refers to storing, adding, removing, updating, changing, etc., geographic coordinates in the memory.

The wireless communication device 160 requests 523 a map of interest from the location server 170. In an embodiment, however, the wireless communication device 160 invokes a map of interest that is pre-stored in the memory of the wireless communication device 160. At step 525, the wireless communication device 160 receives the map of interest either from the location server 170 or from the memory. At step 530, the wireless communication device 160 determines if the stored coordinates in the database lie within the boundaries of the received map. If any geographic coordinates stored in the database lie within coordinates of the map at step 535, the wireless communication device 160 annotates the locations that lie within the boundaries of the map at step 540. Otherwise, if it is determined that none of the stored geographic coordinates lie within the boundaries of the map at step 535, the process terminates at 515.

Figure 6:
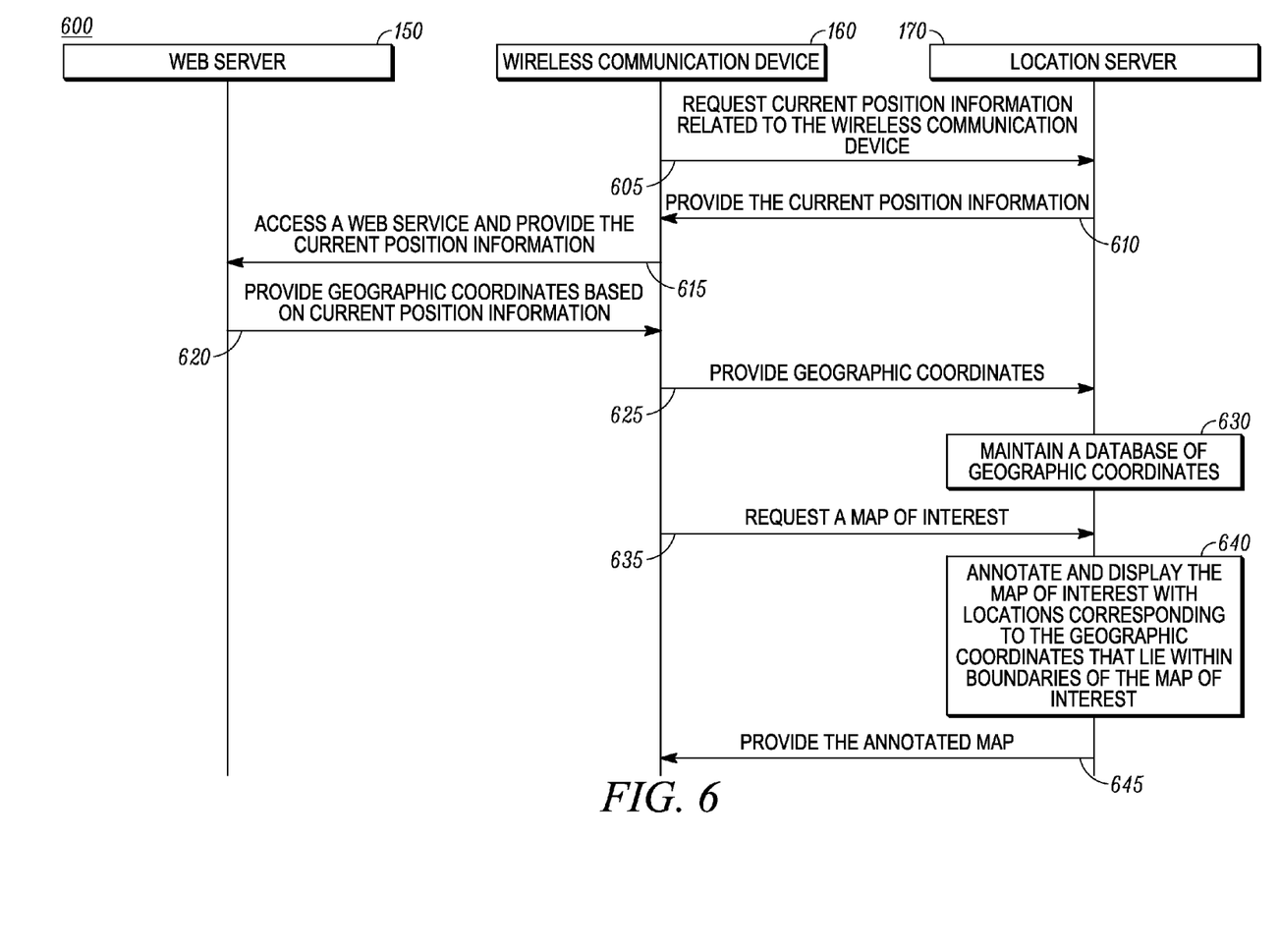
FIG. 6 is a message flow diagram illustrating a method of providing location-based information in accordance with some embodiments.

FIG. 6 is a message flow diagram 600 for providing location-based information in accordance with some embodiments. A wireless communication device 160 requests 605 the current position information of the wireless communication device 160 from the location server 170. Upon receiving the request, the location server 170 sends 610 the current position information to the wireless communication device 160. The wireless communication device 160 accesses 615 a web service of interest to a user of the wireless communication device 160, and provides its current position information to a web server 150 providing the web service.

The wireless communication device 160 receives 620 geographic coordinates which are relevant to the web service from the web server 150 based on the current position information of the wireless communication device 160. For example, the wireless communication device 160 receives geographic coordinates of geographic locations associated with the web service and which lie in and around the geographic location of the wireless communication device 160. The wireless communication device 160 then maintains a database of received geographic coordinates in its memory. In an embodiment, the wireless communication device 160 transmits 625 the received geographic coordinates to the location server 170 in the form of web geo-cookies and the location server 170 maintains 630 a database of the received geographic coordinates. The location server 170 stores the database in, e.g., a persistent memory. In an alternate embodiment, the wireless communication device 160 sends the database of geographic coordinates that it maintains to the location server 170. In an example, the wireless communication device 160 may periodically send its database of geographic coordinates to the location server 170. In another example, the wireless communication device 160 may upload the database to the location server 170 each time the database at the wireless communication device 160 is modified. In other cases, the database may be uploaded each time the wireless communication device 160 requests 635 a map from the location server 170.

The wireless communication device 160 requests 635 a geographic map of a route or a region from the location server 170. On receiving the request, the location server 170 invokes the requested map and determines if the stored geographic coordinates in the database for that wireless communication device 160 lie within the coordinates of the requested map. The location server 170 then annotates 640 the locations corresponding to the geographic coordinates that lie within the boundaries of the requested map. The location server 170 provides lnposelstartlnplnposelendoselstartlnplnposelen doselstartlnplnposelendoselstart645lnposelend the annotated map to the wireless communication device 160 for display. The annotated map provides the current location information of the wireless communication device 160 along with information of locations of interest to the user of the wireless communication device 160 as expressed by previous accesses of particular web services.

Figure 7:
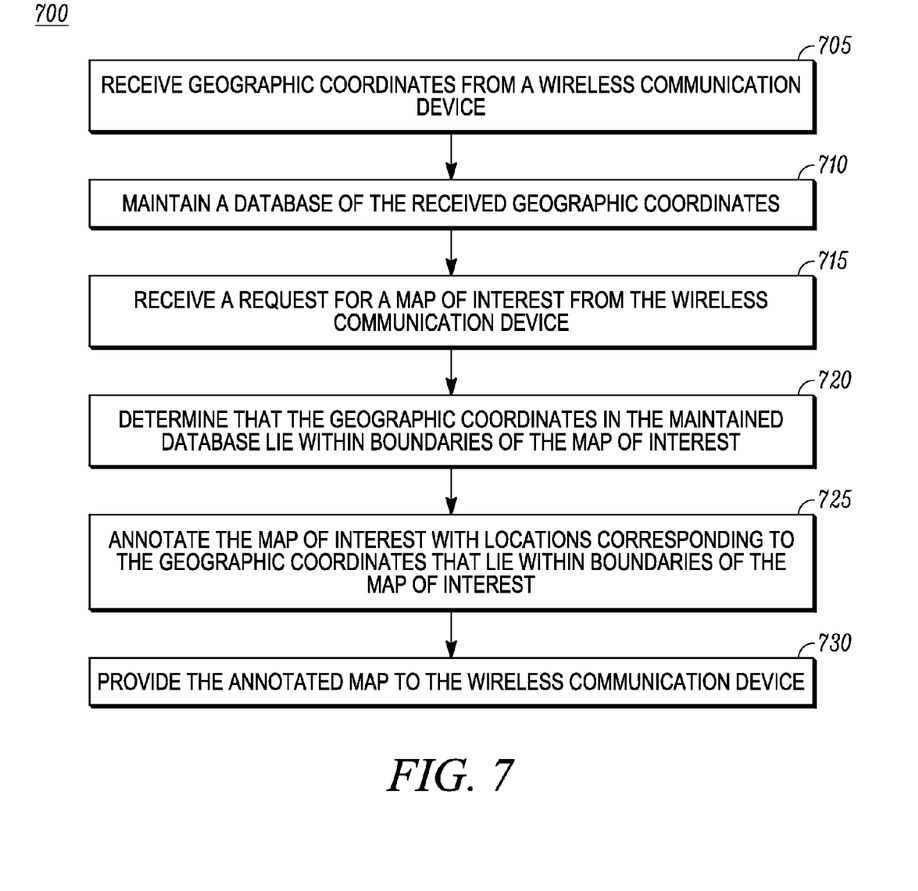
FIG. 7 is a flow chart illustrating a method of providing location-based information in accordance with some embodiments.

FIG. 7 is a flow chart 700 for a location server 170 operating in accordance with the message flow diagram 600 of FIG. 6. As discussed above, the wireless communication device 160 accesses a web site and receives geographic coordinates relevant to the web site. The wireless communication device 160 may tag some of the geographic coordinates as favorites based on, e.g., user selection. The geographic coordinates are then sent to the location server 170. The location server 170 receives geographic coordinates from the wireless communication device 160 at step 705 and maintains a database of the received geographic coordinates in a memory at step 710. At step 715, the location server 170 receives a request for a map of a region or a route from the wireless communication device 160. The location server 170 invokes the requested map and determines if the previously received geographic coordinates lie within the boundaries of the requested map at step 720. At step 725, the location server 170 annotates the locations corresponding to the geographic coordinates which lie within the boundaries of the requested map. The location server 170 then provides the annotated map to the wireless communication device 160 at step 730 for display.

In the foregoing specification, specific embodiments have been described. However, one of ordinary skill in the art appreciates that various modifications and changes can be made without departing from the scope of the invention as set forth in the claims below. Although GPS has been used as the main example for SPS, other SPS systems such as LORAN can be substituted in different implementations. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for providing location-based information in a wireless communication device, the method comprising:
   receiving, by the wireless communication device, geographic position information of the wireless communication device;
   accessing, by the wireless communication device, a web service and providing the geographic position information to a web server providing the web service;
   receiving, by the wireless communication device, geographic coordinates relevant to the web service from the web server;
   maintaining a database in the wireless communication device including at least one of the geographic coordinates;
   accessing, by the wireless communication device, a map of interest;
   determining, by the wireless communication device, that one or more of the geographic coordinates in the database lie within boundaries of the map of interest;
   annotating, by the wireless communication device, the map of interest at locations corresponding to the one or more geographic coordinates that lie within the boundaries of the map of interest; and
   accessing, by the wireless communication device, the web server and providing updated geographic position information of the wireless communication device;
   receiving web cookies from the web server including updated geographic coordinates based on the updated geographic position information; and
   updating the geographic coordinates in the database based on the web cookies.

2. The method of claim 1, wherein the receiving, by the wireless communication device, the geographic position information comprises:
   receiving the geographic position information from a location server.

3. The method of claim 1, further comprising:
   adding, by the wireless communication device, the web service to a favorites list and tagging the web service as a location favorite.

4. The method of claim 1, wherein the geographic coordinates are based on the geographic position information of the wireless communication device.

5. The method of claim 4, wherein the receiving the geographic coordinates based on the geographic position information comprises:
   receiving the geographic coordinates that are prioritized based on their distance from the geographic position information.

6. The method of claim 4, wherein the receiving the geographic coordinates based on the geographic position information comprises:
   receiving the geographic coordinates that are within a predetermined distance from the geographic position information.

7. The method of claim 1, wherein the geographic coordinates relevant to the web service are coordinates of geographic locations associated with the web service.

8. The method of claim 1, wherein the maintaining the database in the wireless communication device comprises:
   storing the received geographic coordinates in a non-volatile memory of the wireless communication device.

9. The method of claim 1, further comprising:
   transmitting, by the wireless communication device, the received geographic coordinates to a non-volatile memory of a remote server.

10. The method of claim 1, wherein the accessing, by the wireless communication device, the map of interest comprises:
    accessing the map of interest that is pre-stored in the wireless communication device.

11. The method of claim 1, wherein the accessing, by the wireless communication device, the map of interest comprises:
    receiving, by the wireless communication device, the map of interest from a location server.

12. The method of claim 1, wherein the accessing, by the wireless communication device, the map of interest comprises:
    accessing a geographic representation of a route or a region of interest to a user.

13. The method of claim 1, further comprising:
    displaying, by the wireless communication device, the annotated map of interest.

14. A method in a location server for providing location-based information to a wireless communication device, the method comprising:
    receiving, by the location server, geographic coordinates from the wireless communication device, wherein the geographic coordinates are relevant to a web service accessed by the wireless communication device and were received by the wireless communication device from a remote web server providing the web service;
    maintaining, by the location server, a database of the geographic coordinates;
    receiving, by the location server, a request for a map of interest from the wireless communication device;
    invoking, by the location server, the requested map of interest;
    determining, by the location server, that one or more of the geographic coordinates in the database lie within boundaries of the map of interest;
    annotating, by the location server, the map of interest at locations corresponding to the one or more geographic coordinates that lie within the boundaries of the map of interest;
    providing, by the location server, the annotated map of interest to the wireless communication device;
    receiving updated geographic coordinates from the wireless communication device and automatically updating the geographic coordinates in the database.

15. The method of claim 14, further comprising:
    receiving, by the location server, a request from the wireless communication device for geographic position information of the wireless communication device; and
    providing, by the location server, the geographic position information to the wireless communication device.

16. A wireless communication device for providing location information to a user, the wireless communication device comprising:
    a receiver for determining geographic position information of the wireless communication device;
    a transceiver unit for
    accessing a web service,
    providing the geographic position information to a web service providing the web service,
    receiving web cookies from the web server that include geographic coordinates based on the geographic position information, and receiving a map of interest from a location server;
a memory for maintaining a database of the geographic coordinates; and
a processor for
determining that one or more of the geographic coordinates in the database lie within boundaries of the map of interest and for annotating the map of interest at locations corresponding to the one or more geographic coordinates that lie within the boundaries of the map of interest, and
updating the geographic coordinates in the database based on the web cookies.

17. The wireless communication device of claim 16, wherein the geographic coordinates are latitude and longitude values of a geographic location.

* * * * *